United States Patent
Kinoshita

(10) Patent No.: US 9,035,897 B2
(45) Date of Patent: May 19, 2015

(54) INPUT APPARATUS AND CONTROL METHOD OF INPUT APPARATUS

(75) Inventor: Kenta Kinoshita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 29 days.

(21) Appl. No.: 13/876,461

(22) PCT Filed: Sep. 28, 2011

(86) PCT No.: PCT/JP2011/005480
§ 371 (c)(1),
(2), (4) Date: Mar. 27, 2013

(87) PCT Pub. No.: WO2012/042876
PCT Pub. Date: Apr. 5, 2012

(65) Prior Publication Data
US 2013/0181931 A1    Jul. 18, 2013

(30) Foreign Application Priority Data
Sep. 28, 2010 (JP) .................... 2010-217621

(51) Int. Cl.
*G09G 5/00* (2006.01)
*G06F 3/041* (2006.01)
*G06F 3/038* (2013.01)
*G06F 3/0488* (2013.01)

(52) U.S. Cl.
CPC .............. *G06F 3/0416* (2013.01); *G06F 3/038* (2013.01); *G06F 3/041* (2013.01); *G06F 3/04886* (2013.01)

(58) Field of Classification Search
CPC ....... G06F 3/038; G06F 3/041; G06F 3/0412; G06F 3/0414; G06F 3/0416; G06F 3/044–3/048; G06F 3/0488; G06F 3/04886; G09G 3/038; G09G 3/041; G09G 3/0412; G09G 3/0414; G09G 3/0416; G09G 3/044–3/048; G09G 3/0488; G09G 3/04886
USPC .................................. 345/173, 174
See application file for complete search history.

(56) References Cited

U.S. PATENT DOCUMENTS

| 2003/0197687 A1 | 10/2003 | Shetter |
| 2005/0225538 A1 | 10/2005 | Verhaegh |
| 2005/0248525 A1 | 11/2005 | Asai |

(Continued)

FOREIGN PATENT DOCUMENTS

| JP | 09-330175 A | 12/1997 |
| JP | 11-272423 A | 10/1999 |

(Continued)

OTHER PUBLICATIONS

International Search Report; PCT/JP2011/005480; Jan. 31, 2012.
(Continued)

*Primary Examiner* — Tom Sheng
(74) *Attorney, Agent, or Firm* — Studebaker & Brackett PC

(57) ABSTRACT

A user interface enabling a user to operate without viewing a screen is generated. An input apparatus 10 according to the present invention includes a touch sensor 103 configured to detect an input position of a touch input, a load detection unit 105 configured to detect a pressure load applied on a touch face of the touch sensor 103, and a control unit 104 configured to, when the load detection unit 105 detects a pressure load satisfying a predetermined standard load, control to generate a virtual user interface having a home position key arranged at the input position.

14 Claims, 11 Drawing Sheets

(56) References Cited

U.S. PATENT DOCUMENTS

| | | | |
|---|---|---|---|
| 2006/0119586 A1* | 6/2006 | Grant et al. | 345/173 |
| 2007/0103454 A1* | 5/2007 | Elias | 345/173 |
| 2007/0146334 A1* | 6/2007 | Inokawa | 345/173 |
| 2009/0201260 A1* | 8/2009 | Lee et al. | 345/173 |
| 2009/0237359 A1 | 9/2009 | Kim et al. | |
| 2009/0250267 A1 | 10/2009 | Heubel et al. | |
| 2009/0256817 A1 | 10/2009 | Perlin et al. | |
| 2010/0085325 A1 | 4/2010 | King-Smith et al. | |
| 2010/0090963 A1 | 4/2010 | Dubs et al. | |
| 2010/0110017 A1* | 5/2010 | Lee | 345/173 |
| 2010/0141590 A1 | 6/2010 | Markiewicz et al. | |
| 2010/0162169 A1* | 6/2010 | Skarp | 715/833 |
| 2011/0012850 A1* | 1/2011 | Melnyk et al. | 345/173 |
| 2011/0248839 A1* | 10/2011 | Kwok et al. | 340/407.2 |
| 2012/0056817 A1* | 3/2012 | Griffin et al. | 345/173 |
| 2013/0271434 A1 | 10/2013 | King-Smith et al. | |
| 2014/0210782 A1 | 7/2014 | King-Smith et al. | |
| 2014/0210783 A1 | 7/2014 | King-Smith et al. | |
| 2014/0210785 A1 | 7/2014 | King-Smith et al. | |
| 2014/0210787 A1 | 7/2014 | King-Smith et al. | |

FOREIGN PATENT DOCUMENTS

| | | |
|---|---|---|
| JP | 2004-054589 A | 2/2004 |
| JP | 2004-341813 A | 12/2004 |
| JP | 2005-149197 A | 6/2005 |
| JP | 2005-531861 A | 10/2005 |
| JP | 2005-317041 A | 11/2005 |
| JP | 2009-087351 A | 4/2009 |
| JP | 2009-245105 A | 10/2009 |
| JP | 2010-086542 A | 4/2010 |
| JP | 2010-146516 A | 7/2010 |
| JP | 2011-513830 A | 4/2011 |
| JP | 2011-519082 A | 6/2011 |
| JP | 2012-511774 A | 5/2012 |

OTHER PUBLICATIONS

An Office Action; "Notice of Reasons for Rejection," issued by the Japanese Patent Office on May 27, 2014, which corresponds to Japanese Patent Application No. 2010-217621 and is related to U.S. Appl. No. 13/876,461; with English language concise explanation.

An Office Action; "Notice of Reasons for Rejection," issued by the Japanese Patent Office on Jan. 6, 2015, which corresponds to Japanese Patent Application No. 2010-217621 and is related to U.S. Appl. No. 13/876,461; with English language concise explanation.

* cited by examiner

FIG. 2
(a)
| CALL | CLEAR | POWER |
|---|---|---|
| 1 | 2 | 3 |
| 4 | 5 | 6 |
| 7 | 8 | 9 |
| * | 0 | # |
HOME POSITION KEY
(b) 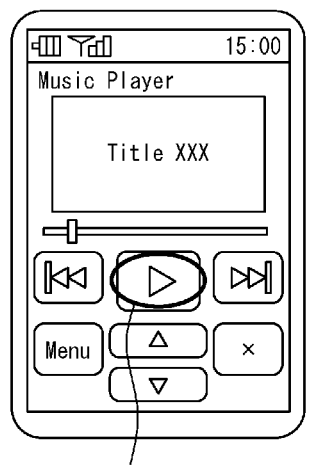
HOME POSITION KEY
(c) 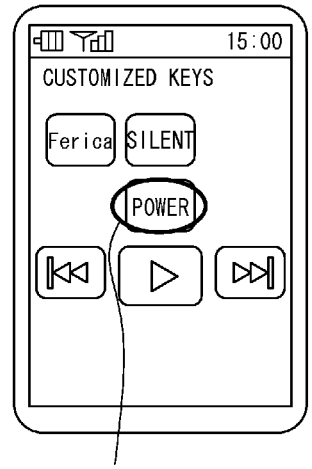
HOME POSITION KEY

INPUT APPARATUS AND CONTROL METHOD OF INPUT APPARATUS

CROSS REFERENCE TO RELATED APPLICATION

This application claims priority to and the benefit of Japanese Patent Application No. 2010-217621 (filed on Sep. 28, 2010), the entire contents of which are incorporated herein by reference.

TECHNICAL FIELD

The embodiment discussed herein relates to an input apparatus having a touch sensor and a control method of the input apparatus.

BACKGROUND

In recent years, an input unit such as an operation unit, a switch and the like for receiving an input operation by a user, a mobile terminal such as a mobile phone having a touch sensor such as a touch panel, a touch switch and the like has been popularly used. Such a mobile terminal, as illustrated in FIG. 11, for example, may be used under a circumstance where, such as in a train packed with passengers, the user has a physical and mental difficulty in operating as viewing a screen of the mobile terminal. When the user operates the mobile terminal relying on his/her sense without viewing the screen under such a circumstance, since the touch panel has no bumped or dented buttons, the user is likely to operate a wrong key. As a conventional technique, there is a scheme, as a method to dynamically display an operation interface on the touch panel, to display a soft keyboard at a contact position when a contact area of a user's finger contacting a tablet exceeds a threshold (for example, see Patent Document 1).

Patent Document 1: Japanese Patent Laid-Open No. 11-272423

SUMMARY

Although the technique according to Patent Document 1 enables the user to vaguely know where the soft keyboard is displayed, the operator is unable to know a detailed arrangement of each key of the soft keyboard. That is, in order to operate the displayed soft keyboard, the user needs to view the panel to know a position of each key.

Accordingly, in consideration of such a condition, an embodiment provides an input apparatus capable of generating a user interface that enables the user to operate without viewing the screen.

In order to achieve the above matter, an input apparatus according to a first aspect includes:

a touch sensor configured to detect an input position of a touch input;

a load detection unit configured to detect a pressure load applied on a touch face of the touch sensor; and a control unit configured to, when the load detection unit detects a pressure load satisfying a predetermined standard load, control to generate a virtual user interface having a home position key arranged at the input position.

An input apparatus according to a second aspect is the input apparatus according to the first aspect, wherein the control unit changes the virtual user interface based on the pressure load.

An input apparatus according to a third aspect is the input apparatus according to the first aspect, further including a tactile sensation providing unit configured to vibrate the touch face of the touch sensor, wherein the control unit, when generating the virtual user interface, controls the tactile sensation providing unit such that a tactile sensation is provided to a pressing object.

An input apparatus according to a fourth aspect is the input apparatus according to the first aspect, wherein the control unit, when the virtual user interface having the home position key arranged at the input position is not generated, controls the tactile sensation providing unit such that a tactile sensation is provided to a pressing object.

Although the apparatuses are used as solutions according to the present invention as described above, it should be understood that the present invention may also be substantialized by methods, programs and storage media storing the programs that substantively correspond to those apparatuses and hence are included in a scope of the present invention.

For example, as a method substantializing the present invention, a control method of an input apparatus according to a fifth aspect of the present invention including a touch sensor configured to detect an input position of a touch input; and a load detection unit configured to detect a pressure load applied on a touch face of the touch sensor, includes a step for generating a virtual user interface having a home position key arranged at the input position when the load detection unit detects a pressure load satisfying a predetermined standard load.

A control method of the input apparatus according to a sixth aspect is the control method of the input apparatus according to the fifth aspect, wherein the virtual user interface is changed based on the pressure load.

A control method of the input apparatus according to a seventh aspect is the control method of the input apparatus according to the fifth aspect, wherein the input apparatus further includes a tactile sensation providing unit configured to vibrate the touch face of the touch sensor; and the tactile sensation providing unit is controlled, when the virtual user interface is generated, such that a tactile sensation is provided to a pressing object.

A control method of the input apparatus according to an eighth aspect is the control method of the input apparatus according to the fifth aspect, wherein the tactile sensation providing unit is controlled, when the virtual user interface having the home position key arranged at the input position is not generated, such that a tactile sensation is provided to a pressing object.

According to the present invention, a user interface that enables a user to operate without viewing a screen may be generated.

BRIEF DESCRIPTION OF DRAWINGS

FIGS. 2(a) to (c) are diagrams illustrating an example of home position keys;

DESCRIPTION OF EMBODIMENT

An embodiment of the present invention will be described in detail with reference to the accompanying drawings. The following embodiment assumes, as an example of an input apparatus according to the present invention, mobile terminals such as a mobile phone and a PDA having touch panels. However, the input apparatus according to the present invention is not limited to these mobile terminals but may be a variety of terminals such as, for example, a gaming machine, a digital camera, a portable audio player, a laptop PC, a mini laptop PC and the like.

Figure 1:
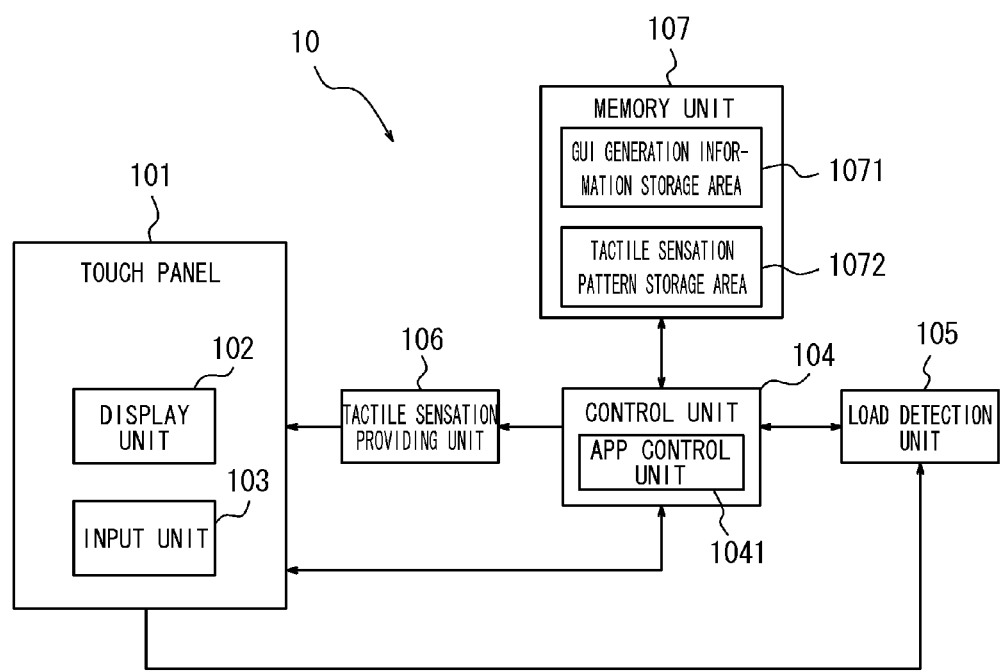
FIG. 1 is a functional block diagram schematically illustrating a configuration of an input apparatus according to the present embodiment.

FIG. 1 is a functional block diagram schematically illustrating an internal configuration of an input apparatus 10 according to the present embodiment. As illustrated in FIG. 1, the input apparatus 10 includes a touch panel 101, a control unit 104, a load detection unit 105, a tactile sensation providing unit 106 and a memory unit 107. According to the present embodiment, the touch panel 101 includes a display unit 102 and an input unit 103. The touch panel 101 is constituted by using the input unit 103 for receiving an input by a user and the display unit 102 having the input unit 103 disposed on a front face thereof.

The display unit 102 of the touch panel 101 is constituted by using, for example, a liquid crystal display (LCD) or an organic EL display. The display unit 102 displays a graphical user interface (GUI) corresponding to each application. The GUI includes, for example, operation objects such as a button and an icon. The input unit 103 configured to detect an input by a user's finger or the like is disposed on the front face of the display unit 102. The input unit 103 constitutes the touch sensor that detects a contact of the user's finger or the like on a touch face of the touch sensor. The touch sensor is of a known type such as, for example, a resistive film type, a capacitive type or an optical type. The input unit 103, when detecting the input by the user's finger or the like, supplies information about an input position to the control unit 104.

The load detection unit 105 detects a pressure load applied on a touch face of the input unit 103 serving as the touch sensor (outputs (generates) a voltage based on the pressure load) and is constituted by using, for example, a piezoelectric element, a strain gauge sensor or the like. The load detection unit 105 supplies the detected pressure load (voltage based on the pressure load) to the control unit 104. Here, when the load detection unit 105 is constituted by using the piezoelectric element, for example, the piezoelectric element outputs a voltage corresponding to an amount of change in the pressure load.

The tactile sensation providing unit 106 transmits vibration to the touch face of the input unit 103 serving as the touch sensor and is constituted by using, for example, the piezoelectric element or an ultrasonic transducer. The tactile sensation providing unit 106 vibrates, thereby providing a tactile sensation to the user's finger or the like pressing the input unit 103.

The memory unit 107 stores information about various applications and a variety of standard loads serving as thresholds, as well as functioning as a work memory.

The memory unit 107 includes a GUI generation information storage area 1071 for storing GUI generation information of the application and a tactile sensation pattern storage area 1072 for storing tactile sensation patterns to be provided. Here, the tactile sensation patterns are defined by vibration manners (a frequency, a phase, a vibration interval, the number of times of vibration and the like), vibration intensity (amplitude) and the like.

The control unit 104 is constituted by using a processor such as a CPU or the like and controls and manages overall input apparatus 10 including each function unit thereof. The control unit 104, based on the tactile sensation pattern retrieved from the tactile sensation pattern storage area 1072, controls the tactile sensation providing unit 106 such that the tactile sensation is provided to the user's finger or the like. Also, the control unit 104 includes an app control unit 1041 for controlling the GUI and operations of the app. The app control unit 1041, based on the information retrieved from the GUI generation information storage area 1071, displays the GUI corresponding to the app on the display unit 102.

Here, the input apparatus 10 according to the present embodiment has a sleep mode, which is a power saving function. That is, the control unit 104, when there is a user's clear instruction to enter the sleep mode or when there is no operation by the user for a predetermined period, makes the input apparatus 10 enter the sleep mode. In the sleep mode, the control unit 104, for example, turns off a display of the display unit 102. Note that the display unit 102 is not the only function unit to be turned off by the control unit 104 in the sleep mode, but other function units may be turned off. In response to a restoring operation by the user, the control unit 104 restores the input apparatus 10 from the sleep mode, such as by turning on the display of the display unit 102.

Further, the control unit 104, based on user interface information retrieved from the GUI generation information storage area 1071, may generate a virtual user interface that functions independently of the display of the display unit 102. The virtual user interface may receive an operation by the user, by acting as if an operation key is displayed on the display unit 102 when the operation key is not displayed on the display unit 102. For example, when the input apparatus 10 is in the sleep mode and the display of the display unit 102 is turned off, the control nit 104, by generating the virtual user interface, may receive the operation by the user without turning on the display of the display unit 102. Especially when the load detection unit 102 detects the pressure load (outputs the voltage based on the pressure load) satisfying the predetermined standard load (a standard voltage), the control unit 104 generates the virtual user interface having a home position key arranged at the input position by the user's finger or the like. The home position key is an operation object serving as a base point for an operation of the user interface.

FIG. 2 illustrates diagrams of an example of the home position key. In FIG. 2(a), a 5 key of operation keys of the mobile phone is set as the home position key. When the user knows a position of each of the keys based on the 5 key serving as the home position key, the user may operate each of the keys by using the 5 key as the base point without viewing the display when the virtual user interface having the 5 key arranged at the input position by the user's finger is generated. In FIG. 2(b), a play key of a music application is set as the home position key. In FIG. 2(c), further, a power key in the user interface uniquely configured by the user is set as the home position key. In both cases of FIGS. 2(b) and (c), when the user knows a position of each key based on the home position key, the user may operate each key by using the home position key as the base point without viewing the display when the virtual user interface having the home position key arranged at the input position of the user's finger is generated.

Figure 3:
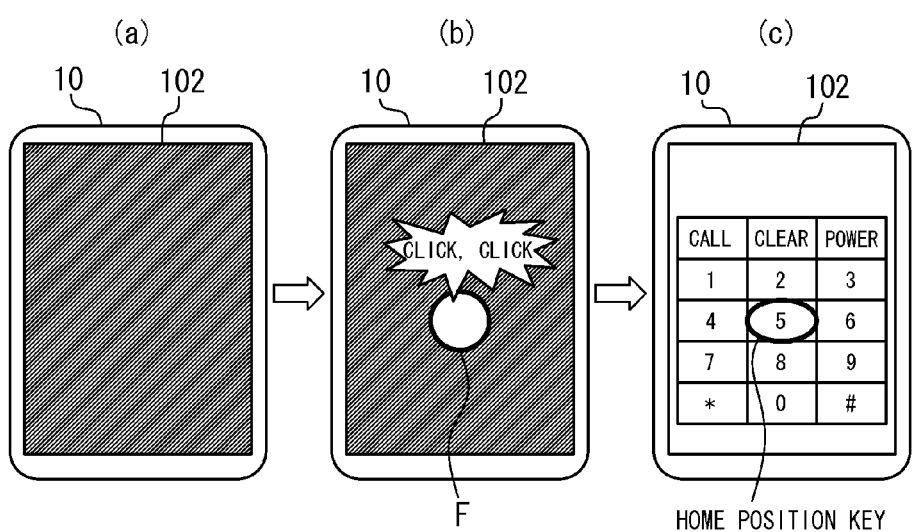
FIGS. 3(a) to (c) are diagrams illustrating an example of generation of a virtual user interface having the home position key as a base point.

FIG. 3 illustrates diagrams of an example of generation of the virtual user interface having the home position key as the base point. In FIG. 3(a), the input apparatus 10 is in the sleep mode and the display of the display unit 102 is turned off. Here, when the user inputs by a finger F as illustrated in FIG. 3(b), the control unit 104, without turning on the display of the display unit 102, generates the virtual user interface having the home position key arranged at the input position. At this time, the control unit 104 may control the tactile sensation providing unit 106 such that the user is notified, through a tactile sensation (for example, two "clicking" vibrations), that the virtual user interface is generated. FIG. 3(c), for the sake of description, illustrates the virtual user interface generated by the input apparatus 10. As illustrated in FIG. 3(c), the input apparatus 10 generates the virtual user interface having the home position key, which is the 5 key, of the operation keys of the mobile phone arranged at the input position. Accordingly, when the user knows a position of each of the keys based on the 5 key serving as the home position key, the user may operate each of the keys by using the 5 key as the base point without viewing the display.

Figure 4:
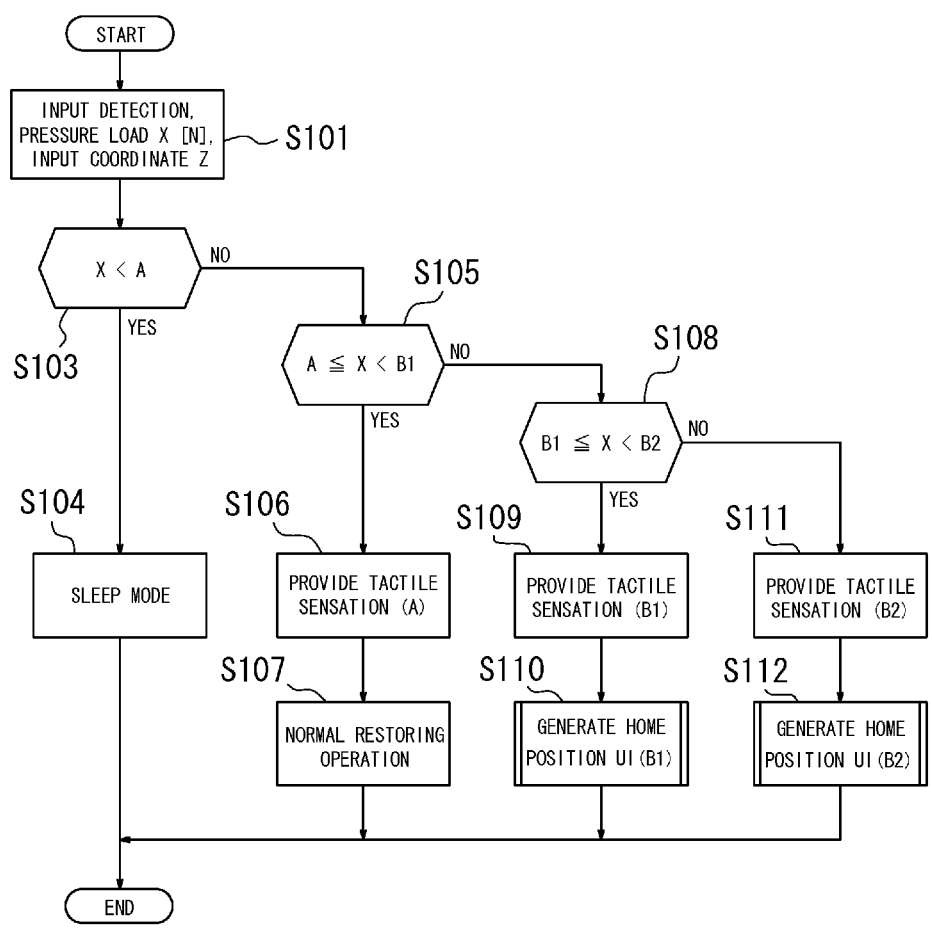
FIG. 4 is a flowchart illustrating an operation of the input apparatus in FIG. 1.
Figure 5:
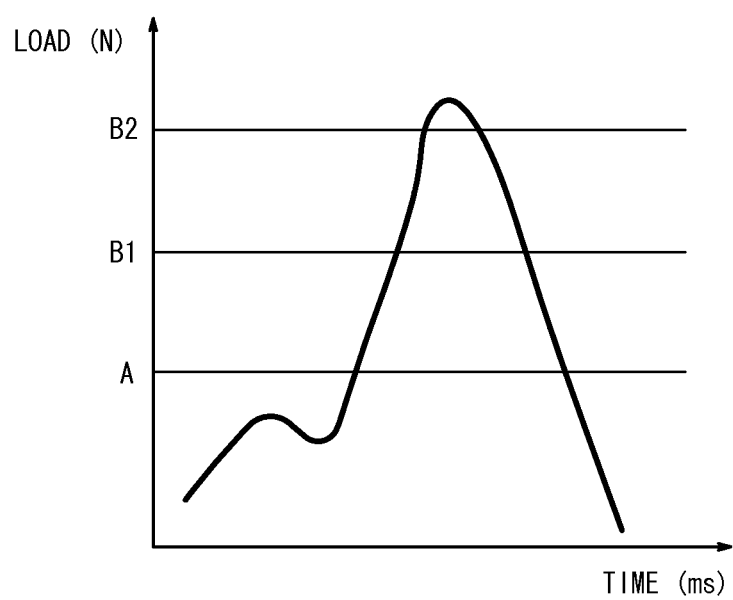
FIG. 5 is a diagram illustrating an example of a standard load.

FIG. 4 is a flowchart illustrating an operation of the input apparatus 10 according to the present embodiment. Hereinafter, the virtual user interface having the home position key as the base point is appropriately referred to as a "home position UI". The input apparatus 10 is in the sleep mode at the start of the operation in the flowchart in FIG. 4. As illustrated in FIG. 5, the memory unit 107 stores a standard load A for the restoring operation from the sleep mode and standard loads B1, B2 for generating the home position UIs, in order to distinguish between the restoring operation from the sleep mode and home position UI generating operations. Each of the standard loads B1, B2 for generating the home position UI has a corresponding application and a corresponding tactile sensation provided at generation of the home position UI.

The operation of the input apparatus 10 starts when the pressing object such as the user's finger or the like contacts the touch face of the input unit 103 serving as the touch sensor. In response to the input by the user, the control unit 104 obtains an input coordinate Z, which is the information about the input position, from the input unit 103 and a pressure load X on the touch face of the input unit 103 from the load detection unit 105 (step S101). Next, the control unit 104 determines whether the pressure load X is smaller than the standard load A for the restoring operation from the sleep mode (step S103). When the pressure load X is smaller than the standard load A for the restoring operation from the sleep mode (YES at step S103), the control unit 104 ends the operation maintaining the sleep mode (step S104).

When the pressure load X is equal to or larger than the standard load A for the restoring operation from the sleep mode (NO at step S103), the control unit 104 determines whether the pressure load X is equal to or larger than the standard load A for the restoring operation from the sleep mode and smaller than the standard load B1 for generating the home position UI (step S105). When the pressure load X is equal to or larger than the standard load A for the restoring operation from the sleep mode and smaller than the standard load B1 for generating the home position UI (YES at step S105), the control unit 104 (app control unit 1041) controls the tactile sensation providing unit 106 to provide a tactile sensation corresponding to the standard load A (for example, one vibration) (step S106) and performs the restoring operation from the sleep mode, such as by turning on the display of the display unit 102 (step S107).

When the pressure load X is equal to or larger than the standard load B1 for generating the home position UI (NO at step S105), the control unit 104 determines whether the pressure load X is equal to or larger than the standard load B1 and smaller than the standard load B2 (step S108). Here, both of the standard load B1 and the standard load B2 are thresholds for generating the home position UIs and indicate that home position UIs of different applications are set for each of the standard loads. That is, the control unit 104, based on the pressure load applied by the user, may generate different home position UIs. When the pressure load X is equal to or larger than the standard load B1 and smaller than the standard load B2 (YES at step S108), the control unit 104 (app control unit 1041) controls the tactile sensation providing unit 106 to provide a tactile sensation corresponding to the standard load B1 (for example, two vibrations) (step S109) and generates the home position UI of an application (for example, a telephone application) corresponding to the standard load B1 (step S110). At this time, the control unit 104 does not need to turn on the display of the display unit 102 to display the home position UI. When the pressure load X is equal to or larger than the standard load B2 (NO at step S108), the control unit 104 (app control unit 1041) controls the tactile sensation providing unit 106 to provide a tactile sensation corresponding to the standard load B2 (for example, three vibrations) (step S111) and generates a home position UI of an application (for example, a music player application) corresponding to the standard load B2 (step S110). At this time also, the control unit 104 does not need to turn on the display of the display unit 102 to display the home position UI.

Figure 6:
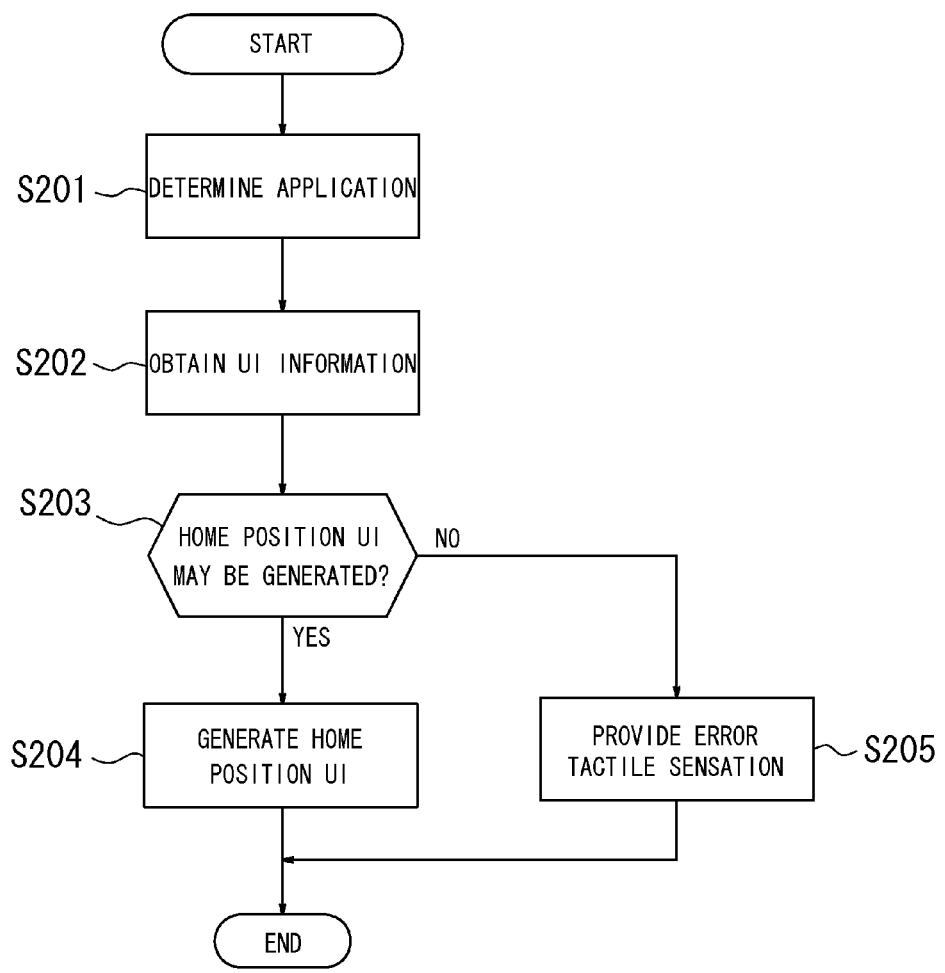
FIG. 6 is a flowchart of generation of the virtual user interface.

FIG. 6 is a flowchart of generation of the home position UI at steps S110, S112. The control unit 104 determines the applications corresponding to load thresholds (B1, B2) (step S201) and retrieves the user interface information of the applications from the GUI generation information storage area 1071 (step S202). The control unit 104 determines whether the home position UI having the home position key at the input coordinate Z may be generated (step S203). When such a home position UI may be generated (YES at step S203), the control unit 104 generates the home position UI (step S204). When such a home position UI is unable to be generated (NO at step S203), the control unit 104 controls the tactile sensation providing unit 106 to provide an error tactile sensation for notifying the user that the home position UI is unable to be generated (step S205).

Figure 7:
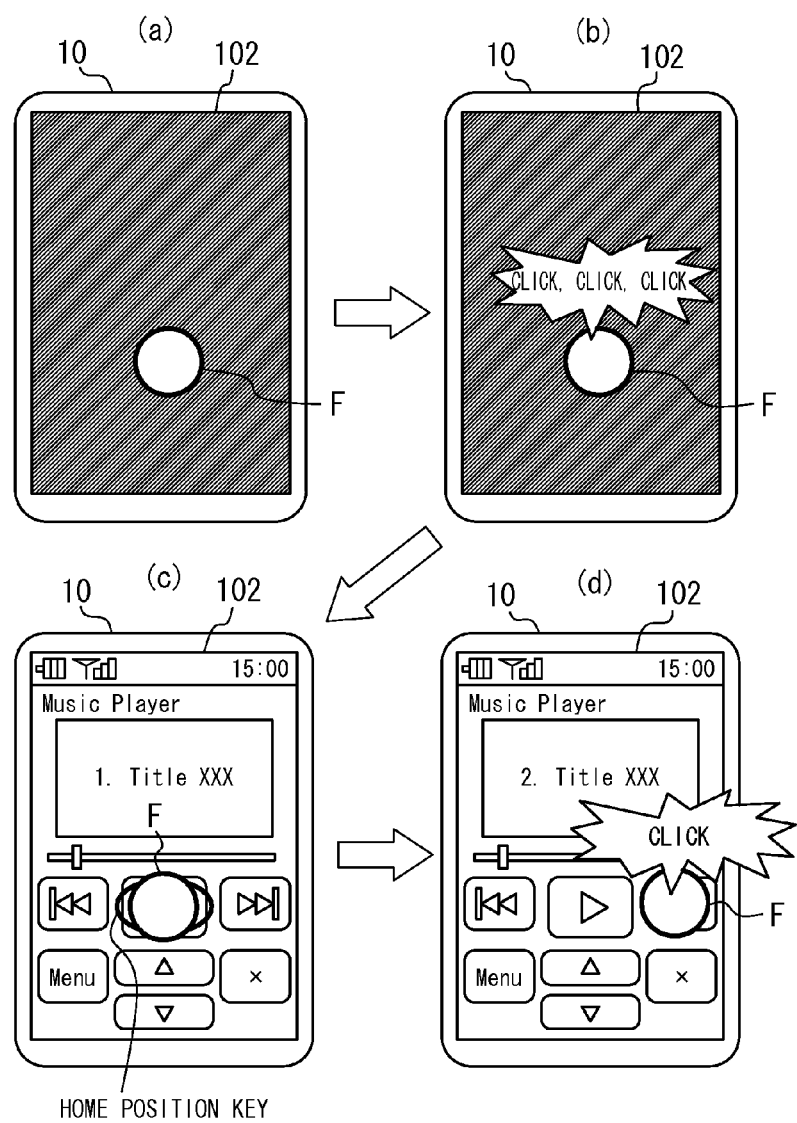
FIGS. 7(a) to (d) are diagrams illustrating an example of generation of the virtual user interface having the home position key as the base point.

FIG. 7 illustrates diagrams of an example of generation of the virtual user interface having the home position key as the base point. In FIG. 7(a), the input apparatus 10 is in the sleep mode and the display of the display unit 102 is turned off. Here, when the user inputs by using the finger F as illustrated in FIG. 7(b), the control unit 104, without turning on the display of the display unit 102, generates the virtual user interface having the home position key arranged at the input position. At this time, the control unit 104 may control the tactile sensation providing unit 106 such that the user is notified, through a tactile sensation (for example, three "clicking" vibrations) that the virtual user interface is generated. FIGS. 7(c) and (d), for the sake of description, illustrate the virtual user interface generated by the input apparatus 10.

As illustrated in FIG. 7(c), the input apparatus 10 generates the virtual user interface having a play key serving as a home position key of the music application arranged at the input position. When the user knows a position of each of the keys based on the play key serving as the home position key, the user may operate, for example, a skip key on the right-hand side of the play key by using the play key as the base point without viewing the display (FIG. 7(d)). At this time, the control unit 104 may control the tactile sensation providing unit 106 such that the user is notified, through the tactile sensation (for example, one "clicking" vibration), that the skip key is operated.

Figure 8:
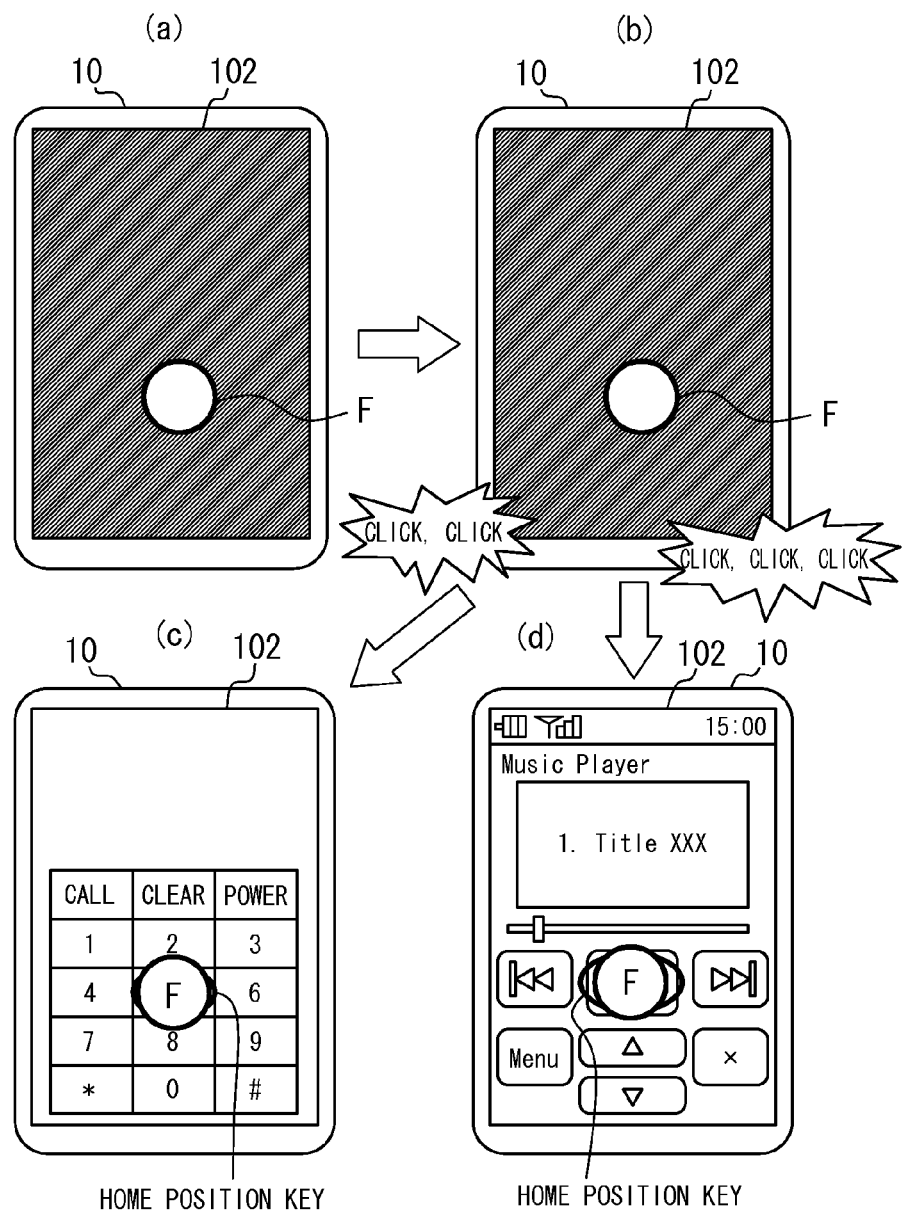
FIGS. 8(a) to (d) are diagrams illustrating an example of generation of the virtual user interface having the home position key as the base point.

FIG. 8 illustrates diagrams of another example of generation of the virtual user interface having the home position key as the base point. In FIG. 8(a), the input apparatus 10 is in the sleep mode and the display of the display unit 102 is turned off. Here, when the user inputs by using the finger F as illustrated in FIG. 8(b), the control unit 104, without turning on the display of the display unit 102, generates the virtual user interface having the home position key arranged at the input position. FIG. 8(c), for the sake of description, illustrates a generated virtual user interface corresponding to the pressure load B1. At this time, the control unit 104 may control the tactile sensation providing unit 106 such that the user is notified, through the tactile sensation (for example, the two "clicking" vibrations), that the virtual user interface is generated. As illustrated in FIG. 8(c), the input apparatus 10 generates the virtual user interface having the 5 key serving as the home position key of the operation keys of the mobile phone arranged at the input position. FIG. 8(d), for the sake of description, illustrates a generated virtual user interface corresponding to the pressure load B2. At this time, the control unit 104 controls the tactile sensation providing unit 106, thereby notifying the user, through the tactile sensation (for example, the three "clicking" vibrations), that the virtual user interface is generated. As illustrated in FIG. 8(d), the input apparatus 10 generates the virtual user interface having the play key serving as the home position key of the music player application arranged at the input position.

Figure 9:
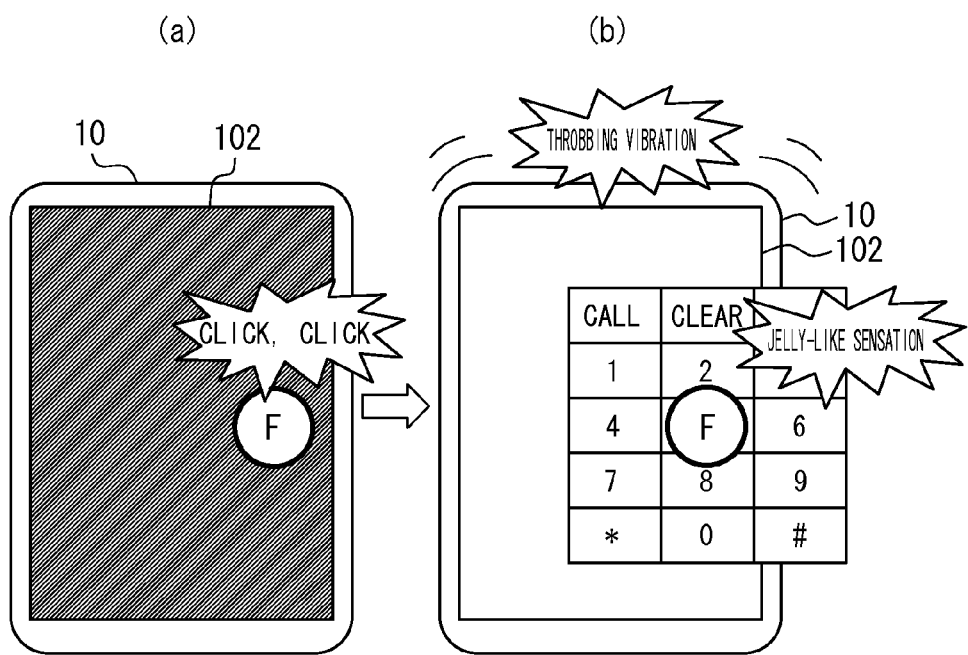
FIGS. 9(a) to (b) are diagrams illustrating an example when the virtual user interface having the home position key as the base point is unable to be generated.

FIG. 9 illustrates diagrams of an example of notification by the error tactile sensation when the home position UI is unable to be generated. When the user inputs to the input apparatus 10 by using the finger A as illustrated in FIG. 9(a), the control unit 104 tries to generate the virtual user interface having the home position key arranged at the input position. In this case, however, since the input position of the user's finger F is located at an edge of the input apparatus 10, the home position UI to be generated may not fit in an area of the input apparatus 10 (or an area for input detection by the input unit 103) as illustrated in FIG. 9(b). Therefore, the control unit 104, in order to notify the user that the home position UI is unable to be generated, controls the tactile sensation providing unit 106 to provide the error tactile sensation for notifying an error. Here, the error tactile sensation for notifying the error may be, for example, a continuous "throbbing" vibration or a "jelly-like" tactile sensation. When the "jelly-like" tactile sensation is provided, the control unit 104 applies a drive signal of, for example, a sine wave of 200-500 Hz for two to three cycles, on the tactile sensation providing unit 106.

Note that the control unit 104, when a part of the generated home position UI is unable to fit in the area of the input apparatus 10 (or the area for input detection by the input unit 103), may notify the user that the home position UI is unable to be generated. Or, for example, when the home position UI includes a plurality of operation objects, at a point when one of the operation objects does not fit in the area of the input apparatus 10 (or the area for input detection by the input unit 103) and is unable to be operated, the control unit 104 may notify the user that the home position UI is unable to be generated.

According to the present embodiment, as described above, when the load detection unit 105 detects the pressure load satisfying the predetermined standard load, the control unit 104 controls to generate the virtual user interface having the home position key arranged at the input position of the user. Accordingly, when the user knows the position of each of the keys based on the home position key serving as the base point, the user may operate each of the keys by using the home position key as the base point without viewing the display. Also, when the input apparatus 10 is in the sleep mode, since the display of the display unit 102 does not need to be turned on to display the user interface, power consumption may be reduced.

Also, the control unit 104 may change the virtual user interface based on the pressure load. Accordingly, the user, by adjusting the intensity of the input by the finger or the like, may generate the virtual user interface of a desired application.

Moreover, the control unit 104, when generating the virtual user interface, controls the tactile sensation providing unit 106 such that the tactile sensation is provided to the pressing object such as the user's finger or the like. Accordingly, the user may unfailingly make sure to generate the virtual user interface. Also, the control unit 104 may control the tactile sensation providing unit 106 to provide a tactile sensation corresponding to a type of the generated virtual user interface. Accordingly, the user, through the tactile sensation, may know which application the generated virtual user interface is associated with.

Further, when the control unit 104 is unable to generate the virtual user interface having the home position key arranged at the input position, the control unit 104 controls the tactile sensation providing unit 106 such that the error tactile sensation is provided to the pressing object such as the user's finger or the like. Accordingly, the user, through the error tactile sensation, may know that the virtual user interface is unable to be generated.

Although the present invention is described based on the figures and the embodiment, it is to be understood that those who are skilled in the art may easily vary or modify in a multiple manner based on disclosure of the present invention. Accordingly, such variation and modification are included in a scope of the present invention. For example, a function or the like of each function unit or each step may be rearranged avoiding a logical inconsistency, such that a plurality of function units or steps are combined or divided.

For example, although the input apparatus 10 is in the sleep mode as an initial state according to the above embodiment, the present invention is applicable also in a normal state in which the display of the display unit 102 of the input apparatus 10 is turned on. In this case, the display unit 102 of the input apparatus 10 displays a standby panel or a GUI of an application being activated. However, by setting a standard load for generating the home position UI higher (or lower) than the standard load for operating the GUI, the operation of the GUI and generation of the home position UI may be distinguished. Also, when the GUI such as the standby panel is displayed on the display unit 102 and there is pressure satisfying the predetermined standard load in an area elsewhere than the operation objects such as the icon and the operation keys, the home position UI may be generated. As described above, also when the GUI such as the standby panel is displayed on the display unit 102, the control unit 104 may generate the home position UI corresponding to the pressure load applied by the user. Accordingly, the user may operate the input apparatus 10 without viewing the display.

Although the virtual user interface is not displayed on the display unit 102 according to the above embodiment, the control unit 104 may display the generated virtual user interface on the display unit 102. In this case, the "virtual user interface" according to the present invention may "receive a user's operation only when the operation keys and the like are displayed on the display unit 102". That is, the "virtual user interface" according to the present invention includes a usual graphical user interface displayed on the display unit 102. In this case also, when the user knows the position of each of the keys based on the home position key serving as the base point, the user may operate each of the keys by using the home position key as the base point without viewing the display. Under a circumstance where the user may view the display, the user may advantageously operate visually confirming the graphical user interface.

In the flow illustrated in FIG. 4 according to the above embodiment, the tactile sensation is provided at step S106 after the determination (YES) at step S105, and the tactile sensation is provided at step S109 after the determination (YES) at step S108. However, the control unit 104 may provide the tactile sensation of step S106 after the determination at step S103 and the tactile sensation of step S109 after the determination at step S105. Thereby, corresponding tactile sensations are provided to the user at points when the pressure load exceeds the predetermined standard loads, which enables the user to know a current pressure load. In this case, the control unit 104, in a normal restoring operation at step S107 or in generation of the home position UI at step S110, may control the tactile sensation providing unit 106 to provide the tactile sensation to the user again.

Although terms such as the pressure load X and the standard load are used in the present specification, when the load detection unit is constituted by using the piezoelectric element, for example, the pressure load X and the standard load may be interpreted as a voltage generated by the piezoelectric element and the standard voltage, respectively.

Also, "when the pressure load X is smaller than the standard load A" for determining "YES" at step S103 in the flow illustrated in FIG. 4 may be, for example, "when the pressure load X becomes zero without reaching the standard load A".

Also, "when the pressure load X is equal to or larger than the standard load A and smaller than the standard load B1" for determining "YES" at step S105 may be, for example, "when the pressure load X becomes equal to or larger than the standard load A and then falls under the standard load A without reaching the standard load B1", "when the pressure load X becomes equal to or larger than the standard load A and then reduces without reaching the standard load B1" or "when the pressure load X becomes equal to or larger than the standard load A and then is maintained for a predetermined period without reaching the standard load B1". For determining "YES" at step S108, a similar determination may be performed with respect to the standard loads B1, B2.

Moreover, "when the pressure load X is equal to or larger than the standard load A" for determining "NO" at step S103 may be "when the pressure load X becomes equal to or larger than the standard load A". For determining "YES" at each of steps S105 and S108, a similar determination may be performed with respect to the standard loads B1, B2.

Figure 10:
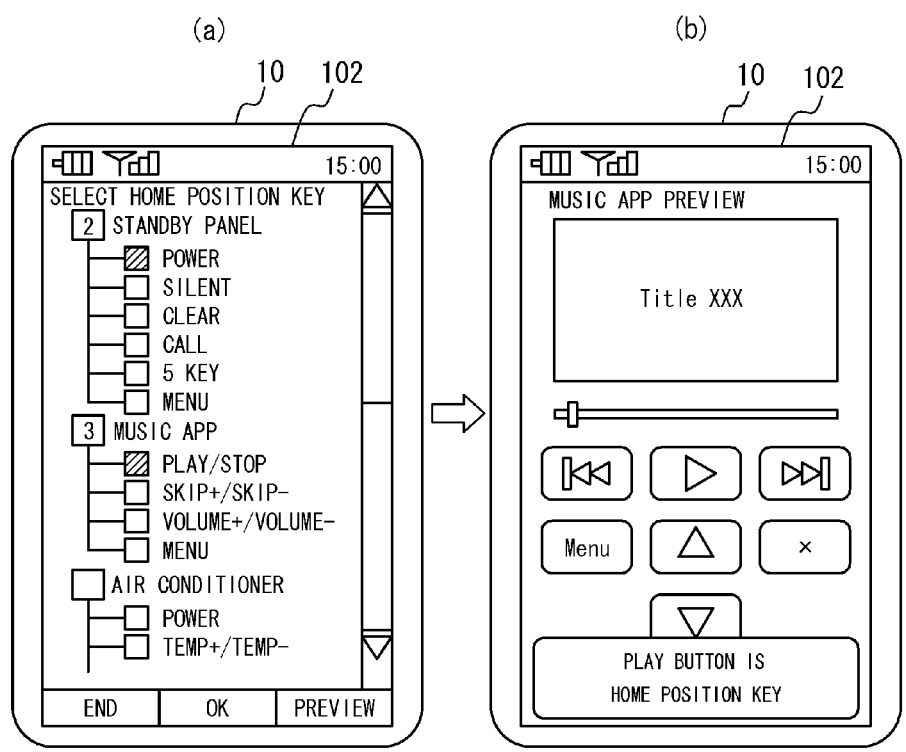
FIGS. 10(a) to (b) are diagrams illustrating an example of a home position key setting panel.
Figure 11:
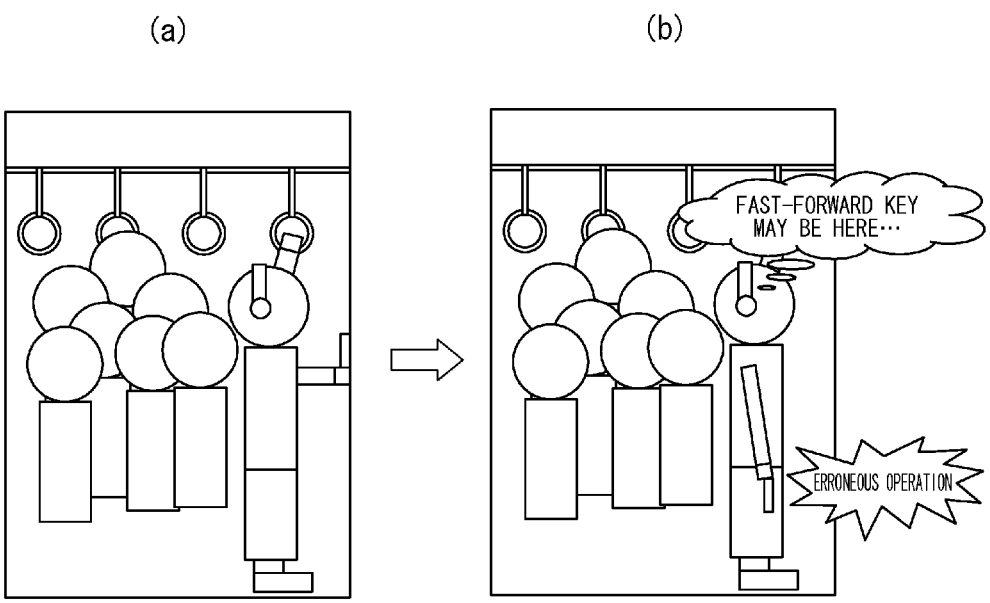
FIGS. 11(a) to (b) are diagrams illustrating an example of a circumstance where a user has a difficulty in viewing a screen.

Further, the home position key does not need to be fixedly set for each application but may be set to any key by the user. FIG. 10 illustrates diagrams of an example of a home position key setting panel for the user. FIG. 10(*a*) illustrates the home position key setting panel, and FIG. 10(*b*) illustrates a preview panel of the home position key set by the user. As illustrated in FIG. 10(*a*), the user, by relating to the user's pressure load, may set the home position UI (application) to be generated and the home position key. In an example in FIG. 10(*a*), a second standard load is related to the standby panel, and a power button is set as the home position key. Also, a third standard load is related to the music application and a play/stop key is set as the home position key. With reference to the preview panel illustrated in FIG. 10(*b*), the user may confirm positions of the home position key currently being selected and keys arranged around the home position key.

REFERENCE SIGNS LIST

10 input apparatus
101 touch panel
102 display unit
103 input unit
104 control unit
1041 app control unit
105 load detection unit
106 tactile sensation providing unit
107 memory unit
1071 GUI generation information storage area
1072 tactile sensation pattern storage area

The invention claimed is:
1. An input apparatus comprising:
a touch sensor configured to detect an input position of a touch input;
a load detection unit configured to detect a pressure load applied on a touch face of the touch sensor; and
a control unit configured to, when the load detection unit detects a pressure load satisfying a predetermined standard load, control to generate a virtual user interface with operation keys having a home position key serving as a base point for an operation of the user interface arranged at the input position.

2. The input apparatus according to claim 1, wherein the control unit changes the virtual user interface based on the pressure load.

3. The input apparatus according to claim 2, wherein the virtual user interface is generated without being displayed.

4. The input apparatus according to claim 1, further comprising a tactile sensation providing unit configured to vibrate the touch face of the touch sensor, wherein
the control unit, when generating the virtual user interface, controls the tactile sensation providing unit such that a tactile sensation is provided to a pressing object.

5. The input apparatus according to claim 4, wherein the virtual user interface is generated without being displayed.

6. The input apparatus according to claim 1, wherein the virtual user interface is generated without being displayed.

7. An input apparatus comprising:
a touch sensor configured to detect an input position of a touch input;
a load detection unit configured to detect a pressure load applied on a touch face of the touch sensor; and
a control unit configured to, when the load detection unit detects a pressure load satisfying a predetermined standard load, control to generate a virtual user interface with operation keys having a home position key arranged at the input position, wherein
the control unit, when the virtual user interface having the home position key arranged at the input position is not generated, controls a tactile sensation providing unit such that a tactile sensation is provided to a pressing object.

8. A control method of an input apparatus including a touch sensor configured to detect an input position of a touch input and a load detection unit configured to detect a pressure load applied on a touch face of the touch sensor, the control method comprising a step for:

generating a virtual user interface with operation keys having a home position key serving as a base point for an operation of the user interface arranged at the input position when the load detection unit detects a pressure load satisfying a predetermined standard load.

9. The control method of the input apparatus according to claim 8, wherein the virtual user interface is changed based on the pressure load.

10. The control method of the input apparatus according to claim 9, wherein the virtual user interface is generated without being displayed.

11. The control method of the input apparatus according to claim 8, wherein the input apparatus further comprises a tactile sensation providing unit configured to vibrate the touch face of the touch sensor; and the tactile sensation providing unit is controlled, when the virtual user interface is generated, such that a tactile sensation is provided to a pressing object.

12. The control method of the input apparatus according to claim 11, wherein the virtual user interface is generated without being displayed.

13. The control method of the input apparatus according to claim 8, wherein the virtual user interface is generated without being displayed.

14. A control method of the input apparatus including a touch sensor configured to detect an input position of a touch input and a load detection unit configured to detect a pressure load applied on a touch face of the touch sensor, the control method comprising a step for:

generating a virtual user interface with operation keys having a home position key arranged at the input position when the load detection unit detects a pressure load satisfying a predetermined standard load, wherein a tactile sensation providing unit is controlled, when the virtual user interface having the home position key arranged at the input position is not generated, such that a tactile sensation is provided to a pressing object.

* * * * *